A. V. ESPINAL.
APPARATUS FOR DETERMINING CENTERS OF BEARINGS AND THE LIKE.
APPLICATION FILED OCT. 7, 1914.
1,146,416. Patented July 13, 1915.
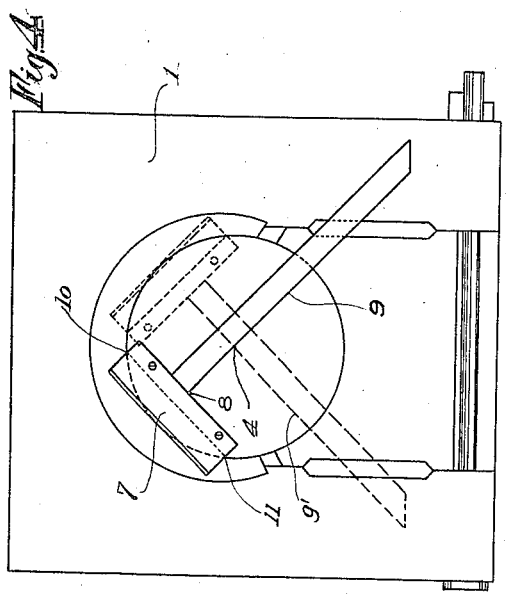
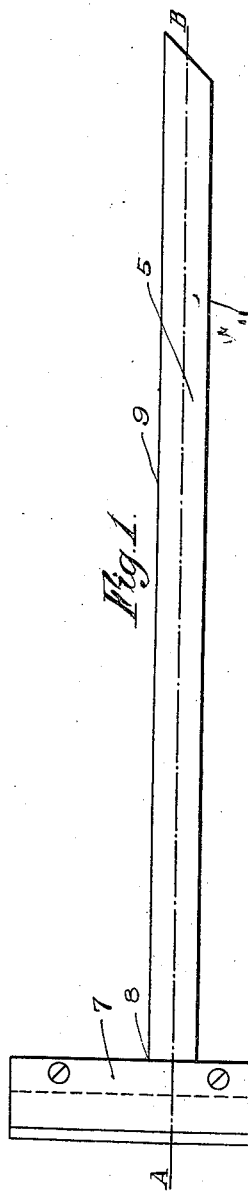
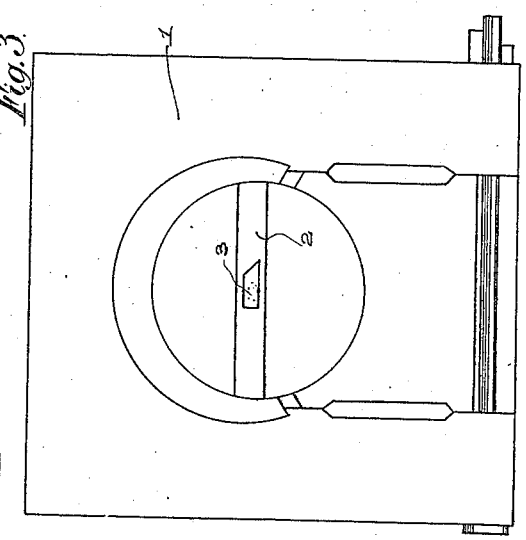
INVENTOR
Antonio Velez Espinal
by by B. Singer
ATTORNEY.

UNITED STATES PATENT OFFICE.

ANTONIO VELEZ ESPINAL, OF BANES, CUBA.

APPARATUS FOR DETERMINING CENTERS OF BEARINGS AND THE LIKE.

1,146,416.　　　　Specification of Letters Patent.　　Patented July 13, 1915.

Application filed October 7, 1914. Serial No. 865,511.

*To all whom it may concern:*

Be it known that I, ANTONIO VELEZ ESPINAL, a citizen of the Republic of Cuba, residing at Banes, Province of Oriente, Cuba, have invented a new and useful Improvement in Apparatus for Determining Centers of Bearings and the like.

The invention relates to apparatus for determining centers.

The object of the invention is to enable the determination of centers of cylindrical bodies in an accurate manner without the necessity of making several tryouts thus eliminating time wasting methods. Other objects will become more apparent by reference to the specification and drawings which form a part thereof.

Figure 1 is a front view of the apparatus. Fig. 2 is a cross-section of the same taken on line A—B. Fig. 3 illustrates the methods in vogue of determining centers. Fig. 4 indicates the method used to determine the centers on journal bearings with the present apparatus.

With reference to Fig. 3, 1 indicates a journal bearing, into the circular aperture of which a transverse wooden bar 2 has been placed. A small piece of tin-plate 3 is secured to the wooden bar approximately at the center thereof. In order to determine the center of the journal bearing a pair of compasses were used, one leg of the compasses being placed on the tin-plate, while the other leg was adjusted to circumscribe the circumference of the journal bearing. In this manner the center could be located after several attempts but due to the number of openings caused by the stationary leg in the tin-plate it was difficult to accurately determine the exact location of the center.

The apparatus forming the subject matter of the invention resembles a T-square used by draftsmen and engineers for the drawing of parallel lines. It comprises a blade 5, a part 6 being disposed at right angles to the blade and underneath the same, while a part 7 placed on top of the blade has its inner edge in alinement with that of part 6, while the outer edge protrudes and is beveled. The blade 5 is so located between the parts 6 and 7 of equal length that the edge 9 is situated at the center of these parts. The three parts of the T-square are secured to each other by screws or other suitable means whereby adjustment may be effected when due to the wear the true setting of the parts with reference to each other becomes unexact.

With reference to Fig. 4, let 1 denote the journal bearing, the center of which is to be determined. The apparatus is then placed in the position indicated in full lines so that points 10 and 11 of the part 6 are situated on the circumference of the journal bearing. A line is drawn along the edge 9 of the blade 5 by means of a pencil or the like. In addition, the apparatus is brought in the position indicated by dotted lines whereupon a line is drawn along the edge 9 thus obtaining the true center 4 located at the intersection of the two drawn lines. The lines are drawn on a transverse wooden bar inserted into the circular aperture, as illustrated in Fig. 3.

I am aware that various changes may be made without departing from the spirit of my invention, and I want to avail myself of all such departures which necessarily come within the scope of the invention and the appended claim.

I claim:

An apparatus for determining the centers of journal bearings, comprising a block adapted to enter the circular opening of said bearing, a cross piece having its forward edge in alinement with the corresponding edge of said block and having its rearward edge projecting beyond said block, and a blade interposed between said block and said cross piece and extending at right angles thereto.

In testimony whereof I affix my signature in presence of two witnesses.

ANTONIO VELEZ ESPINAL.

Witnesses:
　GUILLERMO DU BOUCHET,
　ENRIQUE DE ALHEAR.

Copies of this patent may be obtained for five cents each, by addressing the "Commissioner of Patents, Washington, D. C."